Figure 1:
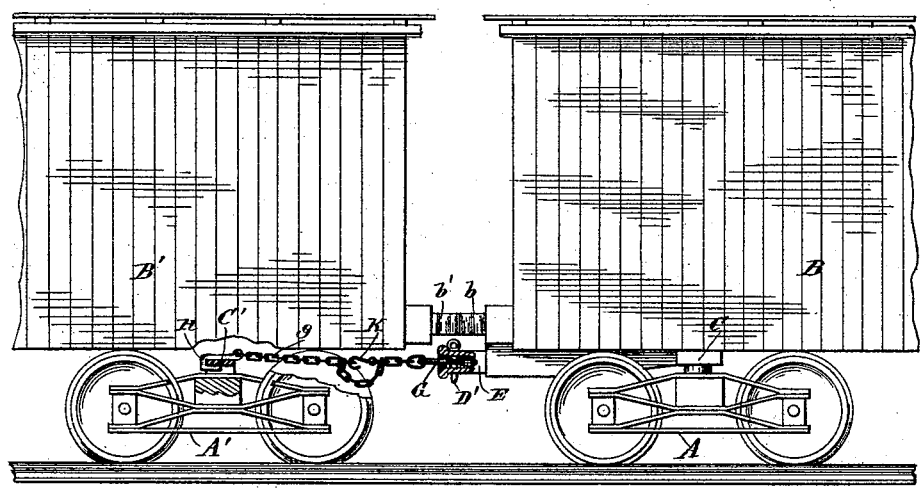

(No Model.)  J. E. MULLANEY.  2 Sheets—Sheet 1.
CHAIN COUPLING FOR CARS.

No. 473,014. Patented Apr. 19, 1892.

Witnesses.
Emma F. Elmore
A. H. Opsahl

Inventor.
John E. Mullaney
By his Attorney.
Jas. F. Williamson (No Model.) 2 Sheets—Sheet 2.

J. E. MULLANEY.
CHAIN COUPLING FOR CARS.

No. 473,014. Patented Apr. 19, 1892.

Witnesses.
A. H. Opsahl.
Emma F. Elmore.

Inventor.
John E. Mullaney
By his Attorney.
Jas. F. Williamson

United States Patent Office.

JOHN E. MULLANEY, OF MINNEAPOLIS, MINNESOTA, ASSIGNOR OF ONE-HALF TO LOUIS R. THIAN, OF SAME PLACE.

CHAIN COUPLING FOR CARS.

SPECIFICATION forming part of Letters Patent No. 473,014, dated April 19, 1892.

Application filed September 5, 1891. Serial No. 404,856. (No model.)

*To all whom it may concern:*

Be it known that I, JOHN E. MULLANEY, mechanic, of the city of Minneapolis, in the county of Hennepin, State of Minnesota, one of the States of the United States of America, have invented a certain new and useful Improvement in Movable Chain Draw-Bars and Safety Chain Couplers for Railway-Cars; and I do hereby declare that the following is a full, clear, and exact description of the same, reference being had to the accompanying drawings.

My invention is designed, primarily, as a substitute for a disabled draw-bar and link—as, for example, on cars where the draw-bar has been broken or pulled out; and the invention is also capable of use to reinforce the ordinary couplings for the purpose of greater safety, especially in the case of platform-cars carrying a load—such as rails, logs, and other articles—which extend over the coupling-spaces from one car to another. To this end I provide a chain having hooks at its opposite extremities and a link at its center of a shape similar to the ordinary link used in the link-and-pin coupling and of approximately the same size. In case the draw-bar of a car is in any way disabled, as by being broken or drawn out, my chain can be immediately substituted for the same by using the central link of the chain as the ordinary coupling-link in engagement with the pin in the draw-bar of the adjacent car and by engaging the hooks at the opposite ends of the chain over the transom-iron of the disabled car on the opposite sides of the king-bolt connecting the transom with the truck. When used to reinforce the ordinary couplings as a safety appliance, the chain is extended across the coupling-space alongside of the draw-bars of the coupled cars with the hooks at the extremities of the chain engaging over the transoms of the respective cars. Hence, if the regular couplings should for any reason part the cars would be held together by the chain.

The chain is provided with a pair of hooks, located one between the center link and each end of the chain for taking up the slack. Hence in either usage a taut coupling or connection can be effected between the two cars.

The chain in both of its uses is illustrated in the accompanying drawings, therein like letters referring to like parts throughout.

Figure 2:
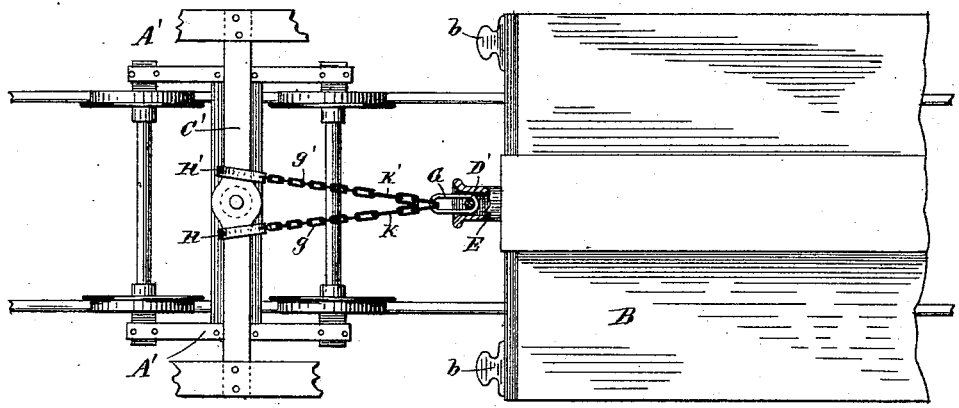
Figure 3:
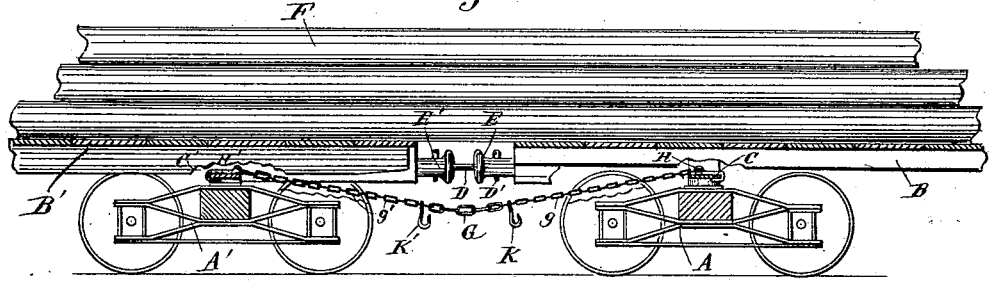
Figure 4:
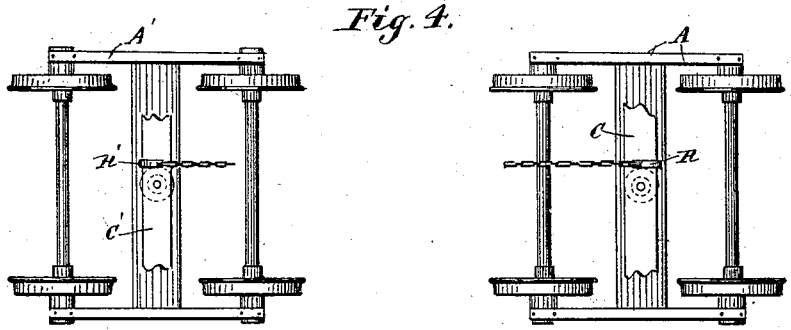
Figure 5:
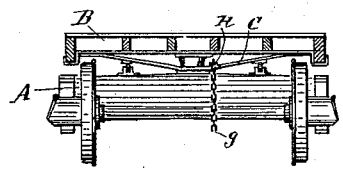
Figure 6:
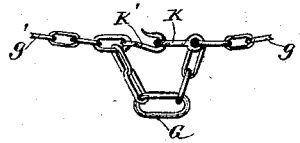

Figure 1 is a side elevation of adjacent parts of a pair of cars with some portions broken away, with my chain in position for use as a substitute for a draw-bar. Fig. 2 is a plan view of the same, with some parts of the car-bodies removed and other parts broken away. Fig. 3 is a central longitudinal section of adjacent parts of a pair of platform-cars with the chain in position for use as a reinforcing or safety device. Fig. 4 is a view in plan of parts of the adjacent trucks shown in Fig. 3. Fig. 5 is a rear elevation of one of the trucks, and Fig. 6 a detail showing one way in which the hooks may be used when the chain is used as a safety device to take up the slack.

A A' are the trucks, and B B' the bodies of adjacent cars. C C' represent the respective transoms of the same.

D represents an ordinary coupling-link, and D' an ordinary coupling-pin, and E E', as shown in Fig. 3, represent the ordinary draw-bars.

In Figs. 1 and 2 the draw-bar E' is not shown, the car in this respect being represented as disabled by the breakage or withdrawal of the draw-bar.

F in Fig. 3 represents a load of such a character that it must be extended over the coupling-spaces and supported by adjacent cars—such, for example, as long timbers.

G $g$ $g'$ represent the body of the chain, of which G is the central link, similar to the ordinary coupling-link in shape and size, and $g$ $g'$ the end portions of the chain.

H H' are the hooks at the opposite ends of the chain, preferably made of rectangular form, so as to fit over the edge of the transom-iron.

K K' are the hooks for taking up the slack, located one on each of the parts $g$ and $g'$.

Referring to Figs. 1 and 2, it will be seen that the central link G occupies the position of an ordinary coupling-link, and that the parts $g$ and $g'$ extend backward in the same direction and that the hooks H and H' engage over the rear edge of the transom-iron on the opposite sides of the king-bolt. It may also be seen by reference to Fig. 1 that the hooks K and K' are employed to take up the slack and make a tight or taut connection between the two cars, the cars being represented as drawn together as closely as their bumpers b b' will permit. When so used, it is evident that the chain substitute is practically as good as the ordinary draw-bar. In virtue of the provision for taking up the slack there need be no more play of the parts or difficulty in controlling the cars than if the ordinary draw-bar was in its working position. In this usage my invention is of great value, as it obviates or reduces to a minimum the delays and annoyances constantly arising from broken and pulled-out draw-bars. This is especially true in freight service.

In the usage illustrated in Figs. 3, 4, and 5 it is evident that in case any of the coupling parts should break or the draw-bar of either car be withdrawn the chain would come into action to couple together the two cars. The separation of the cars and the dropping of the load would there by be prevented.

It is contemplated that several of these chains will be carried in the engine cab or caboose of every train, so as to be available for use whenever required. It is especially intended for use on trains running in freight service.

The hooks K and K', located on the opposite sides of the center link of the body of the chain for taking up the slack, are of great importance toward the practical success of this chain coupling. It is only by the addition of these slack-hooks that a taut connection can be made between the cars which will hold their bumpers in contact. Unless such a taut connection is made a chain coupling is worthless. The links would snap and the cars could not be controlled. It should be noticed that the central link, which is used for coupling purposes when applied to a single car, also constitutes a link proper of the chain itself.

What I claim, and desire to secure by Letters Patent of the United States, is as follows:

1. The chain having end hooks, a central link capable of use as an ordinary coupling-link, and a pair of hooks for taking up slack, located one on each of the end portions of the chain, whereby the said chain may be used either as a substitute for the ordinary draw-bar and link or to reinforce the ordinary couplings and effect a taut connection between the cars, substantially as described.

2. A movable chain draw-bar and safety chain coupler for railway-cars, comprising a chain having hooks at its extremities, a coupling-link at its center constituting one of the links of the chain and capable of use either as a coupling-link or as the central link of the chain, and a pair of hooks for taking up slack, located one on each of the end portions of the chain between the central link and the end hooks of the chain, the said parts being arranged and capable of use, substantially as and for the purpose set forth.

In testimony whereof I affix my signature in presence of two witnesses.

JOHN E. MULLANEY.

Witnesses:
JAS. F. WILLIAMSON,
EMMA F. ELMORE.